United States Patent [19]

Biegen

[11] Patent Number: 4,869,593

[45] Date of Patent: Sep. 26, 1989

[54] INTERFEROMETRIC SURFACE PROFILER

[75] Inventor: James F. Biegen, Middletown, Conn.

[73] Assignee: Zygo Corporation, Middlefield, Conn.

[21] Appl. No.: 185,075

[22] Filed: Apr. 22, 1988

[51] Int. Cl.[4] .............................................. G01B 9/02
[52] U.S. Cl. .................................... 356/351; 356/359
[58] Field of Search ................................ 356/351, 359

[56] References Cited

U.S. PATENT DOCUMENTS

| 4,632,556 | 12/1986 | Akatsu | 356/359 X |
| 4,639,139 | 1/1987 | Wyant et al. | 356/359 |
| 4,732,483 | 3/1988 | Biegen | 356/351 |

Primary Examiner—Davis L. Willis
Assistant Examiner—Matthew W. Koren
Attorney, Agent, or Firm—Bryan, Cave, McPheeters & McRoberts

[57] ABSTRACT

In accordance with several embodiments of the instant invention, an interferometric profiler is provided which is capable of measuring accurately the topography of a test surface comprising a light source with high spatial and temporal coherence, a rotating diffuser disc, onto which light from said source impinges to form a second extended light source having greatly reduced spatial coherence while retaining high temporal coherence; a first lens and beamsplitter assembly, most preferably a polarizing beamsplitter and quarter-wave phase retardation plate, to collect a direct, preferably without significant light loss, a light beam produced from the light from said extended second light source; a second lens for focusing said light beam onto test and reference surfaces; a two-beam interferometer which divides said light beam into test wavefronts and reference wavefronts and directs said test wavefronts and reference wavefronts onto said test and reference surfaces; and a piezoelectric transducer, for varying the relative distance between said test and reference surfaces; said two-beam interferometer, recombining said test wavefronts and reference wavefronts after they have interacted separately with said test and reference surfaces to produce an interference pattern; said second lens, imaging said test and reference surfaces onto the photosensitive elements of an imaging device.

In accordance with another embodiment of the instant invention, the interferometric profiler can have a light source which can be either spatially coherent or incoherent of either temporally coherent or incoherent electromagnetic radiation.

80 Claims, 5 Drawing Sheets

INTERFEROMETRIC SURFACE PROFILER

CROSS-REFERENCE TO RELATED APPLICATIONS

This application is related to my copending U.S. patent applications, entitled "Interferometric Surface Profiler", bearing U.S. Ser. No. 027,643, filed March 19, 1987, now Pat. No. 4,732,483, and "Coating and Method for Testing Plano and Spherical Wavefront Producing Optical Surfaces and Systems Having a Broad Range of Reflectivities", bearing U.S. Ser. No. 109,715, filed October 16, 1987, the contents of which are specifically incorporated by reference herein in its entirety and is an improvement thereon.

BACKGROUND OF THE INVENTION

1. Field of the Invention

The present invention relates to apparatus for the noncontact measurement of the profile of a surface. More particularly, the invention relates to optical apparatus which is useful for the high accuracy measurement of surface roughness or of the height of a step change in a thickness of an opaque film on a substrate.

2. The Prior Art

Prior art techniques available for measuring the profile of a surface include mechanical and optical profilers. A commonly used contacting apparatus used to measure surface profiles and step heights is a stylus instrument, e.g., the Talysurf or the Talystep. However, in the case of a soft or delicate surface, the stylus digs into the surface and measurement results do not truly represent the surface. Other limitations of the stylus technique include its high sensitivity to microphonics and vibrations, the delicate nature of the stylus and the mechanism, and the need for a highly skilled operator to align and use it.

There are numerous optical techniques available for measuring the profile of a surface. For a review and comparison of some of the more common techniques, see J. M. Bennett, "Comparison of Techniques for Measuring the Roughness of Optical Surfaces," *Optical Engineering*, Vol. 24, No. 3, pp. 380-387, 1985.

Prior art optical profilers have been based on a variety of techniques, e.g., scanning fringes of equal chromatic order (FECO) interferometry, see for example, J. M. Bennett, "Measurement of the RMS Roughness, Autocovariance Function and Other Statistical Properties of Optical Surfaces using a FECO Scanning Interferometer," *Applied Optics*, Vol. 15, pp. 2705-2721 (1976); scanning Fizeau interferometry, see for example, J. M. Eastman and P. W. Baumeister, "Measurement of the Microtopography of Optical Surfaces using a Scanning Fizeau Interferometer," *J. Opt. Soc. Am.*, Vol. 64, p. 1369 (A) (1974); optical heterodyne interferometry, see for example, G. E. Sommargren, "Optical Heterodyne Profilometry," *Applied Optics*, Vol. 20, pp. 610-618 (1981); a Mirau interferometer, see for example, B. Bhushan, J. C. Wyant, and C. L. Koliopoulis, "Measurement of Surface Topography of Magnetic Tapes by Mirau Interferometry," *Applied Optics*, Vol. 24, pp. 1489-1497 (1985), and J. C. Wyant and K. N. Prettyjohns, U.S. Pat. No. 4,639,139, issued January 27, 1987; a Nomarski-based instrument, see for example, S. N. Jabr, "Surface-roughness measurement by digital processing of Nomarski phase contrast images," *Optics Letters*, Vol. 10, pp. 526-528 (1985); a birefringent microscope, see for example, M. J. Downs, U.S. Pat. No. 4,534,649, issued August 13, 1985; and shearing interference microscopy, see for example, M. Adachi and K. Yasaka, "Roughness measurement using a shearing interference microscope," *Applied Optics*, Vol. 25, pp. 764-768 (1986).

FECO interferometry requires that the test surface be brought very close to the reference surface, e.g., typically within about several micrometers, thereby frequently causing the test surface to be damaged by residual dust particles.

The optical heterodyne interferometer which is both common path and does not require a reference surface produces very accurate and precise measurements. While this technique provides state-of-the-art optical measurements, it suffers from a number of limitations. In particular, the apparatus is complex and expensive. In addition, since the technique only scans in a circle of fixed radius, it does not profile an area of the test surface.

The conventional white light or filtered white light Mirau type interferometer suffers from several serious limitations. First, since a beamsplitter and reference surface must be placed between the objective lens and the test surface, only mid-range objective lens magnifications can be used. Second, the central obscuration caused by the placement of the reference surface in the beam path of the imaged wavefronts adversely affects the image contrast of mid-range spatial frequencies. Third, due to the presence of these optics between the objective lens and the test surface, an extended light source is required. With a conventional light source, the coherence length is thusly limited to 3-6 micrometers. This short coherence length leads not only to a very tight vertical alignment tolerance for the test surface to obtain interference fringes, but also limits the amount of tilt and curvature of the test surface which can be measured. Other two-beam, equal path interferometer microscopes such as the Michelson and Linnik when used with an extended incoherent illumination source suffer the same tight vertical alignment tolerance as does the Mirau interferometer microscope.

The birefringent microscope technique is both common path and does not require a reference surface. However, it does have some severe limitations. First, it only scans a line so that it does not profile an area of the test surface. Second, it is limited in its ability to use a sufficiently large diameter for the reference beam on the test surface, thereby limiting the extent to which lower spatial frequencies can be measured.

In the present invention, high precision profile measurements can be made wherein the interference of a two-beam microscope interferometer is localized within the full depth of focus of every microscope objective lens magnification permitting a large vertical alignment tolerance. Large test surface tilt, out of plane separation of features, and curvature can be tolerated relative to the prior art. Low magnification (i.e., 1X to 5X) objectives can now utilize the Mirau type interferometer configuration. Improved mid-range spatial frequency response for all magnifications is realized without the central obscuration of the prior art. The improvements of the present invention, thusly, overcome the disadvantages of the prior art and allow the high accuracy, fine lateral resolution measurement of surface microroughness profiles and step heights.

SUMMARY OF THE INVENTION

In accordance with several embodiments of the instant invention, I provide an an interferometric profiler capable of measuring accurately the topography of a test surface comprising a light source with high spatial and temporal coherence, most preferably a linearly polarized laser; means, most preferably a rotating diffuser disc, onto which light from said source impinges to form a second extended light source having greatly reduced spatial coherence while retaining high temporal coherence; an optical system comprising a first lens and beamsplitter assembly, most preferably a polarizing beamsplitter and quarter-wave phase retardation plate, to collect and direct, preferably without significant light loss, a light beam produced from the light from said extended second light source; a second lens for focusing said light beam onto test and reference surface; a two-beam interferometer, most preferably an equal path interferometer, which divides said light beam into test wavefronts and reference wavefronts and directs said test wavefronts and reference wavefronts onto said test and reference surfaces; means, most preferably a piezoelectric transducer, for varying the relative distance between said test and reference surfaces; means, said two-beam interferometer, for recombining said test wavefronts and reference wavefronts after they have interacted separately with said test and reference surfaces to produce an interference pattern; means, said second lens, for imaging said test and reference surfaces onto the photosensitive elements of an imaging device, most preferably a solid-state array camera; means, most preferably said polarizing beamsplitter and quarter-wave phase retardation plate, which direct, preferably without significant light loss, said recombined test wavefronts and reference wavefronts to said imaging device; means, said imaging device, for sensing said interference pattern; means, most preferably a CCTV monitor, for viewing said imaged test and reference surfaces and said interference pattern; means for processing the output of said imaging device to provide a topographic profile of the test surface.

In accordance with another embodiment of the instant invention, I provide an interferometric profiler capable of measuring accurately the topography of a test surface comprising a light source which can be either spatially coherent or incoherent of either temporally coherent or incoherent electromagnetic radiation, most preferably a linearly polarized laser; means, most preferably a rotating diffuser disc, onto which light from said linearly polarized light source impinges to form a linearly polarized second light source having, most preferably, greatly reduced spatial coherence while retaining high temporal coherence; an optical system comprising a first lens and polarizing beamsplitter, to collect and direct, preferably without significant light loss, a first linearly polarized light beam produced from the light from said extended second light source; a first quarter-wave phase retardation plate which converts said first linearly polarized light beam into a circularly polarized light beam; a second lens for focusing said circularly polarized light beam onto test and reference surfaces; a reference surface coating which is, most preferably, a metallic or semi-metallic coating on said reference surface and an anti-reflection coating on said metallic or semi-metallic coating to form an unobscuring said reference surface; a second quarter-wave phase retardation plate on which is located said reference surface which converts said circularly polarized light beam into a second linearly polarized light beam; a third quarter-wave phase retardation plate, on which is located the beamsplitter surface, that divides said second linearly polarized light beam into test wavefronts and reference wavefronts and directs said test wavefronts and reference wavefronts onto said test and reference surfaces; means, most preferably a piezoelectric transducer, for varying the relative distance between said test and reference surfaces; means, most preferably, said beamsplitter surface for recombining said test wavefronts and reference wavefronts after they have interacted separately with said test and reference surfaces to produce an interference pattern; means, said first quarter-wave phase retardation plate, said second quarter-wave phase retardation plate, said third quarter-wave phase retardation plate, and said polarizing beamsplitter, which optically isolate said imaged test and reference surfaces and said interference pattern; means, said second lens, for imaging said test and reference surfaces onto the photosensitive elements of an imaging device, most preferably a solid-state array camera; means, said first quarter-wave phase retardation plate, for converting said circularly polarized light beam, into a third linearly polarized light beam which has its polarization vector rotated 90° relative to said first linearly polarized light beam; means, said polarizing beamsplitter, which directs said third linearly polarized light beam, preferably without significant light loss, to said imaging device; means, said imaging device, for sensing said interference pattern; means, most preferably a CCTV monitor, for viewing said imaged test and reference surfaces and said interference pattern; means for processing the output of said imaging device to profile the topography of said test surface.

THE DRAWINGS

DETAILED DESCRIPTION OF THE INVENTION

Figure 1:
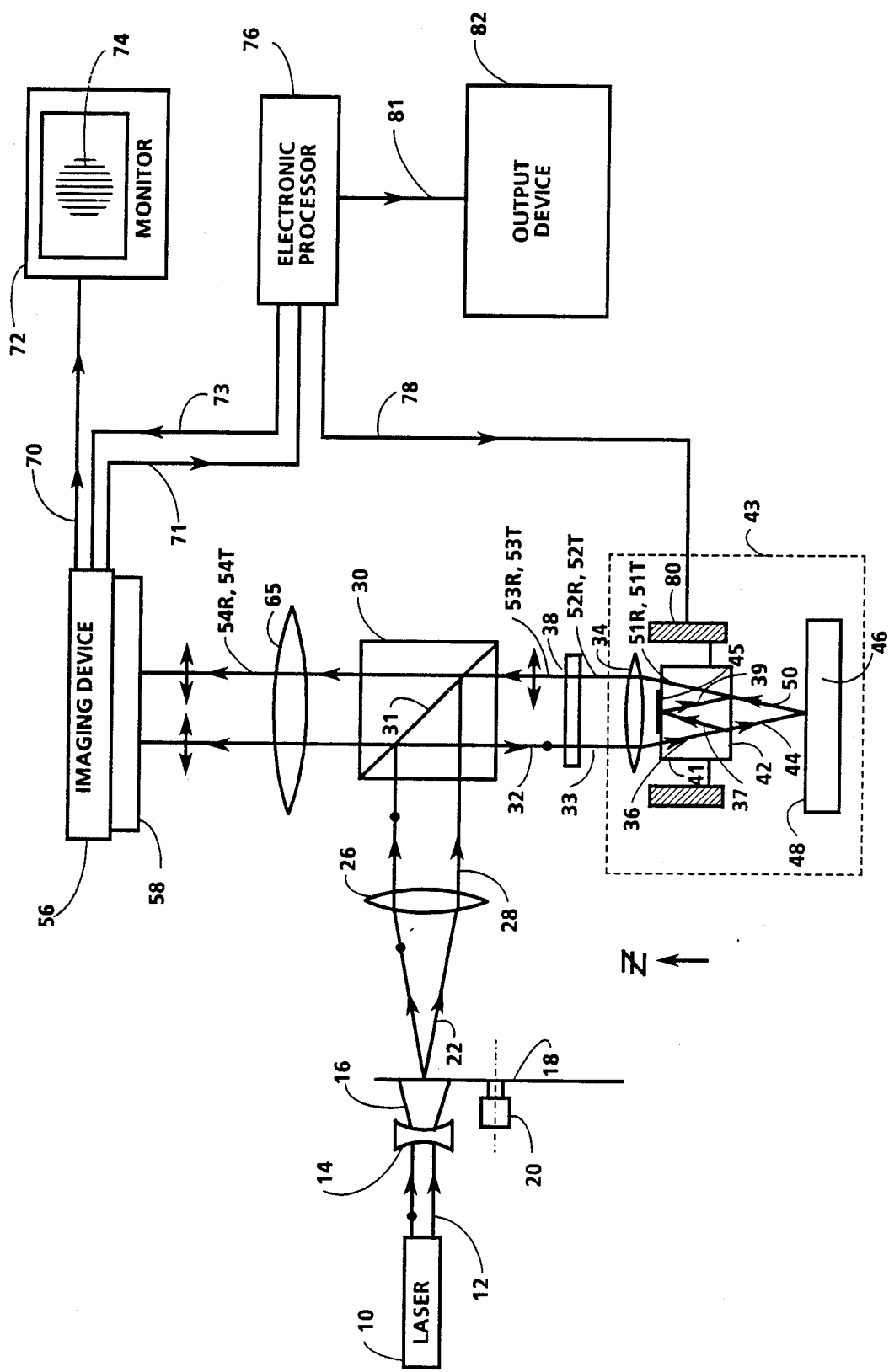
FIG. 1 depicts in schematic form one embodiment of the instant invention.

FIG. 1 depicts in schematic form one embodiment of the instant invention for providing noncontact measurement of the profile of a surface. While the apparatus of the present invention has application for a wide range of spatially and temporally coherent radiation sources, the following description is taken by way of example, with respect to an optical measuring system, such as one employing a linearly polarized laser. Light source (10), which most preferably is a linearly polarized laser, emits a nearly collimated single frequency beam (12) which is linearly polarized perpendicular to the plane of FIG. 1 as indicated by the dot. Lens (14) transforms beam (12) into a spherically diverging wavefront (16) which impinges onto a diffuser disc (18) to produce wavefronts (22) which are scattered from the diffuser disc (18). Diffuser disc (18) is rotated by a motor (20) to greatly reduce the spatial coherence of the spherically diverging wavefronts (22) to render the spherically diverging wavefronts (22) spatially incoherent. Means other than a rotating diffuser disc (18) can be used to reduce the spatial coherence. Alternatively, it can be a non-moving liquid crystal of the dynamic scattering type or a liquid or solid acousto-optic modulating cell. Lens (26) transforms spherically diverging wavefronts (22) into collimated wavefronts (28) which are totally reflected by the polarizing beamsplitter diagonal surface (31) of the polarizing beamsplitter (30), to become collimated wavefronts (32). Collimated wavefronts (32) first pass through a quarter-wave phase retardation plate (38) converting the linear polarization light of collimated wavefronts (32) into circularly polarized collimated wavefronts (33) and then pass through to objective lens (34) and Mirau interferometer (43), which is comprised of interferometer plate (41) which has beamsplitter surface (42) and reference surface (45). The Mirau interferometer (43), comprised of interferometer plate (41) is supported by the piezoelectric transducer (80). Objective lens (34) transforms circularly polarized collimated wavefronts (33) into converging wavefronts (36) which are transmitted through the interferometer plate (41) to impinge on the beamsplitter surface (42). The beamsplitter surface (42) reflects approximately half of the beam intensity of the converging wavefronts (36) to become the converging reference wavefronts (37) which are again transmitted through the interferometer plate (41) to focus on the reference surface (45). The portion of the converging wavefronts (36) transmitted through the beamsplitter surface (42) become the test wavefronts (44) which then come to focus on the test surface (48). The test wavefronts (44) and reference wavefronts (37) converge to form an out of focus image of the area illuminated on the diffuser disc (18) by the spherically diverging wavefront (16) on the test surface (48) and reference surface (45). Test wavefronts (44) reflect from the test surface (48) to form diverging test wavefronts (50) and the reference wavefronts reflect from the reference surface (45) to form the diverging reference wavefronts (39). The diverging test wavefronts (50) and diverging reference wavefronts (39) recombine and interfere at the beamsplitter surface (42) to form diverging wavefronts (51R, 51T). Diverging test and reference wavefronts (51R, 51T) are collected by objective lens (34) to become recollimated test and reference wavefronts (52R, 52T) which then pass through the quarter-wave phase retardation plate (38) becoming test and reference wavefronts 53R, 53T and rotating the linear polarization 90° relative to the collimated wavefronts (32) thereby permitting total transmission through the polarizing beamsplitter (30). The linearly polarized test and reference wavefronts (53R, 53T) are made converging test and reference wavefronts (54R, 54T) by the imaging lens (65) which then focus onto the photosensitive elements (58), or pixels, of an imaging device (56), which can be a solid state camera with either a CCD, CID, MOS, or photodiode array. The converging test and reference wavefronts (54R, 54T) brought to a focus form overlaying images of the test surface (48) and reference surface (45) together with the interference pattern representing the relative optical path differences between the test surface (48) and reference surface (45). Imaging device (56) may be a linear array with either the interference pattern or the array scanned in a direction orthogonal to the length of the array for some applications. The standard RS170 video output (70) of the imaging device (56) is fed into a CCTV monitor (72) to provide an image (74) of the interference pattern produced by converging wavefronts (54R, 54T).

The diverging wavefront (16) impinging onto the rotating diffuser disc (18) creates an extended, spatially incoherent illumination source that retains a high degree of temporal coherence. High temporal coherence permits interference to be localized over the entire depth of focus of every objective lens (34) magnification easing the vertical alignment tolerance to obtain fringes over prior art means of illumination. On low magnification objective lenses the depth of focus is on the order of tenths of a millimeter to a millimeter. Using a prior art means of illumination consisting of a filtered white light incandescent source which permits a fringe localization depth within a narrow band on the order of 3-5 microns deep can make the acquiring of fringes a tedious, time consuming process.

The interferometer plate (41) is attached to the piezoelectric transducer (80) which varies the spacing between the reference surface (45) and test surface (48) by producing motion of the interferometer plate (41) in the Z direction under the control of an electrical signal (78). The output (71) provides the photosignals from the array of pixels of imaging device (56) to the electronic processor (76) to control the imaging device (56) if needed. The electronic output (78) from electronic processor (76) is fed into the piezoelectric transducer (80) to modulate the interference pattern imaged onto the photosensitive device (58). The electronic output (78) from electronic processor (76) is fed into output device (82), e.g., CRT, printer, or a plotter, to view or record the topography of the test surface (48).

Figure 2:
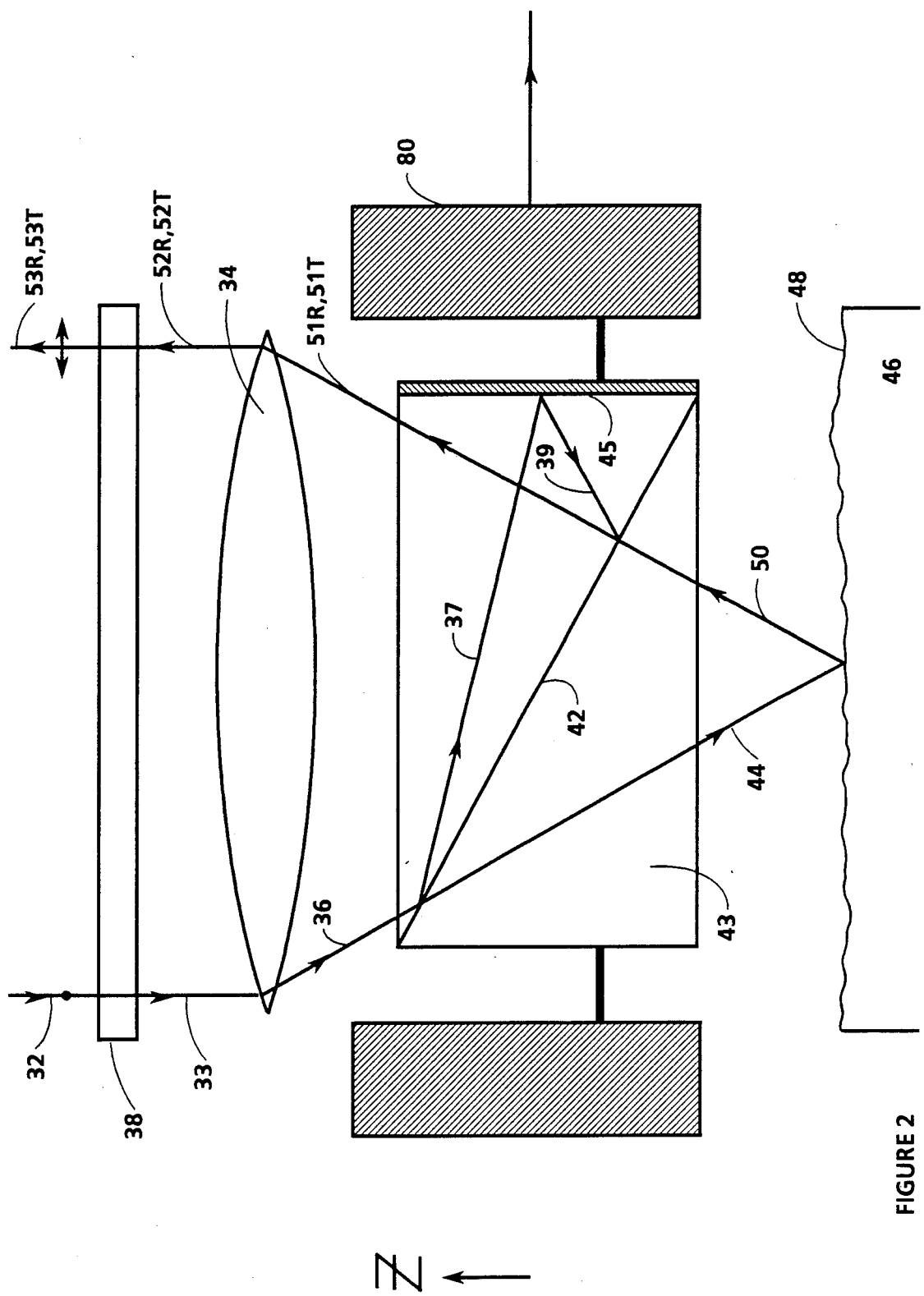
FIG. 2 depicts in schematic form a second embodiment of the instant invention.

FIG. 2 depicts in schematic form a second embodiment of the instant invention for providing noncontact measurement of the profile of a surface. A number of elements and functions thereof are common to the first embodiment of the instant invention and hence given the same reference numbers. The difference between FIG. 1 of the first embodiment and FIG. 2 of the second embodiment is that a Michelson type rather than a Mirau type two-beam interferometer is employed. The Michelson interferometer, the interferometer beamsplitter cube (43) and reference surface (45), is attached to the piezoelectric transducer (80). Collimated wavefronts (32) first pass through a quarter-wave phase retardation plate (38) converting the linear polarization of collimated wavefronts (32) into circularly polarized collimated wavefronts (33). Objective lens (34) transforms circularly polarized collimated wavefronts (33) into converging wavefronts (36) which are transmitted through the interferometer beamsplitter cube (43) to impinge on the beamsplitter surface (42). The beamsplitter surface (42) reflects the incident light through an angle of 90°, rather than upwards as in the Mirau type interferometer. Approximately half of the beam intensity of the converging wavefronts (36) becomes the converging reference wavefronts (37). The converging reference wavefronts (37) continue through the interferometer beamsplitter cube (43) to focus on the reference surface (45) which now lies outside the beam paths of the converging wavefronts (36) eliminating any obscuration of the converging wavefronts (36). The portion of the converging wavefronts (36) transmitted through the beamsplitter surface (42) become the test wavefronts (44) which then come to focus on the test surface (48). Test wavefronts (44) reflect from the test surface (48) to form diverging test wavefronts (50) and the reference wavefronts reflect from the reference surface (45) to form the diverging reference wavefronts (39). The diverging test wavefronts (50) and diverging reference wavefronts (39) recombine and interfere at the beamsplitter surface (42) to form diverging test and reference wavefronts (51R, 51T). Diverging test and reference wavefronts (51R, 51T) are collected by objective lens (34) to become recollimated test and reference wavefronts (52R, 52T) and pass through a quarter-wave phase retardation plate (38) rotating the linear polarization 90° relative to the collimated wavefronts (32) becoming linear polarized test and reference wavefronts (53R, 53T). The test surface (48) and reference surface (45) together with the resulting interference pattern representing the relative optical path differences between the test surface (48) and reference surface (45) is then imaged onto the photosensitive elements (58), or pixels, of an imaging device (56).

The interferometer beamsplitter cube (43) is attached to the piezoelectric transducer (80) which varies the spacing between the reference surface (45) and test surface (48) by producing motion of the interferometer beamsplitter cube (43) in the Z direction under the control of an electrical signal (78). The electronic output (78) from electronic processor (76) is fed into the piezoelectric transducer (80) to modulate the interference pattern imaged onto the photosensitive device (58).

Figure 3:
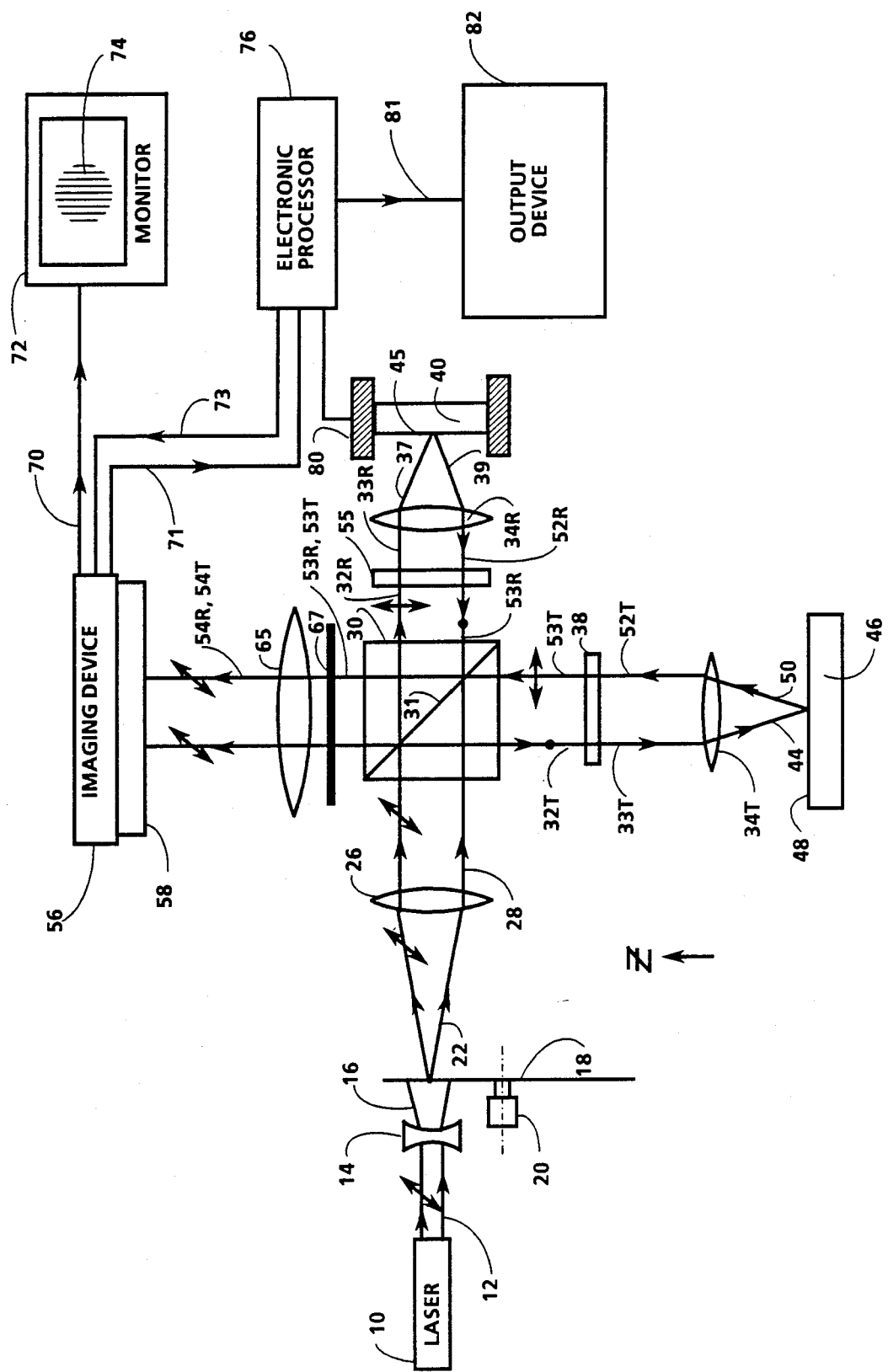
FIG. 3 depicts in schematic form a third embodiment of the instant invention.

FIG. 3 depicts in schematic form a third embodiment of the instant invention for providing noncontact measurement of the profile of a surface. A number of elements and functions thereof are common to the first embodiment of the instant invention and hence given the same reference numbers. The difference between FIG. 1 of the first embodiment and FIG. 3 of the third embodiment is that a Linnik type rather than a Mirau type two-beam interferometer is employed. Light source (10) emits a nearly collimated beam (12) which is linearly polarized as indicated by the slanted arrow, the exact orientation being determined by the test surface reflectivity so as to equalize the beam intensities between the two arms of the interferometer. Lens (26) transforms spherically diverging wavefronts (22) into collimated wavefronts (28) which are partially reflected by the polarizing beamsplitter diagonal surface (31) of the polarizing beamsplitter (30) to become collimated test wavefronts (32T) and partially transmitted by the polarizing beamsplitter (30) to become collimated reference wavefronts (32R). The collimated test wavefronts (32T) first pass through a quarter-wave phase retardation plate (38) converting the linearly polarized light into circularly polarized light becoming circularized polarized collimated test wavefronts (33T) and are then directed to the test objective lens (34T) which transforms circularized polarized collimated test wavefronts (33T) into converging test wavefronts (44) which then come to focus on the test surface (48). Converging test wavefronts (44) reflect from the test surface (48) forming diverging test wavefronts (50) which are collected by test objective lens (34T). Diverging test wavefronts (50) are recollimated by the test objective lens (34T) and then pass through the quarter-wave phase retardation plate (38) rotating the incident linear polarization of the collimated test wavefronts (32T) 90° thereby permitting total transmission through the polarizing beamsplitter (30).

The remainder of the collimated wavefronts (28) not reflected by the polarizing beamsplitter diagonal surface (31), the collimated reference wavefronts (32R), are transmitted through the polarizing beamsplitter (30) and quarter-wave phase retardation plate (55) which converts the linearly polarized light into circularly polarized light. The reference objective lens (34R) converts the circularly polarized collimated reference wavefronts (33R) into the converging reference wavefronts (37) which focus onto the reference surface (45). The reference surface substrate (40), on which is located the reference surface (45), is attached to the piezoelectric transducer (80). Diverging reference wavefronts (39) are recollimated to become recollimated reference wavefronts (52R) by the reference objective lens (34R) and then pass through the quarter-wave phase retardation plate (55) rotating the polarization relative to the collimated reference wavefronts (32R) 90° to become linear polarized thereby permitting total reflection by the polarizing beamsplitter (30). The recollimated test wavefronts (53T) and recollimated reference wavefronts (53R) recombine at the polarizing beamsplitter diagonal surface (31) and continue through the analyzer (67) where the recollimated test and reference wavefronts (53R,T) are caused to interfere. The recollimated test and reference wavefronts (53R,T) are made converging test and reference wavefronts (54R,T) by the imaging lens (65) which then focus onto the photosensitive elements (58), or pixels, of an imaging device (56), the superimposed images of the test surface (48) and reference surfaces (45) together with the interference pattern representing the relative optical path differences between the test surface (48) and reference surface (45).

The reference surface substrate (40) is attached to the piezoelectric transducer (80) which varies the spacing between the reference surface (45) and test surface (48) by producing motion of the reference surface substrate (40) in the Z direction under the control of an electrical signal (78). The electronic output (78) from electronic processor (76) is fed into the piezoelectric transducer (80) to modulate the interference pattern imaged onto the photosensitive device (58).

Figure 4:
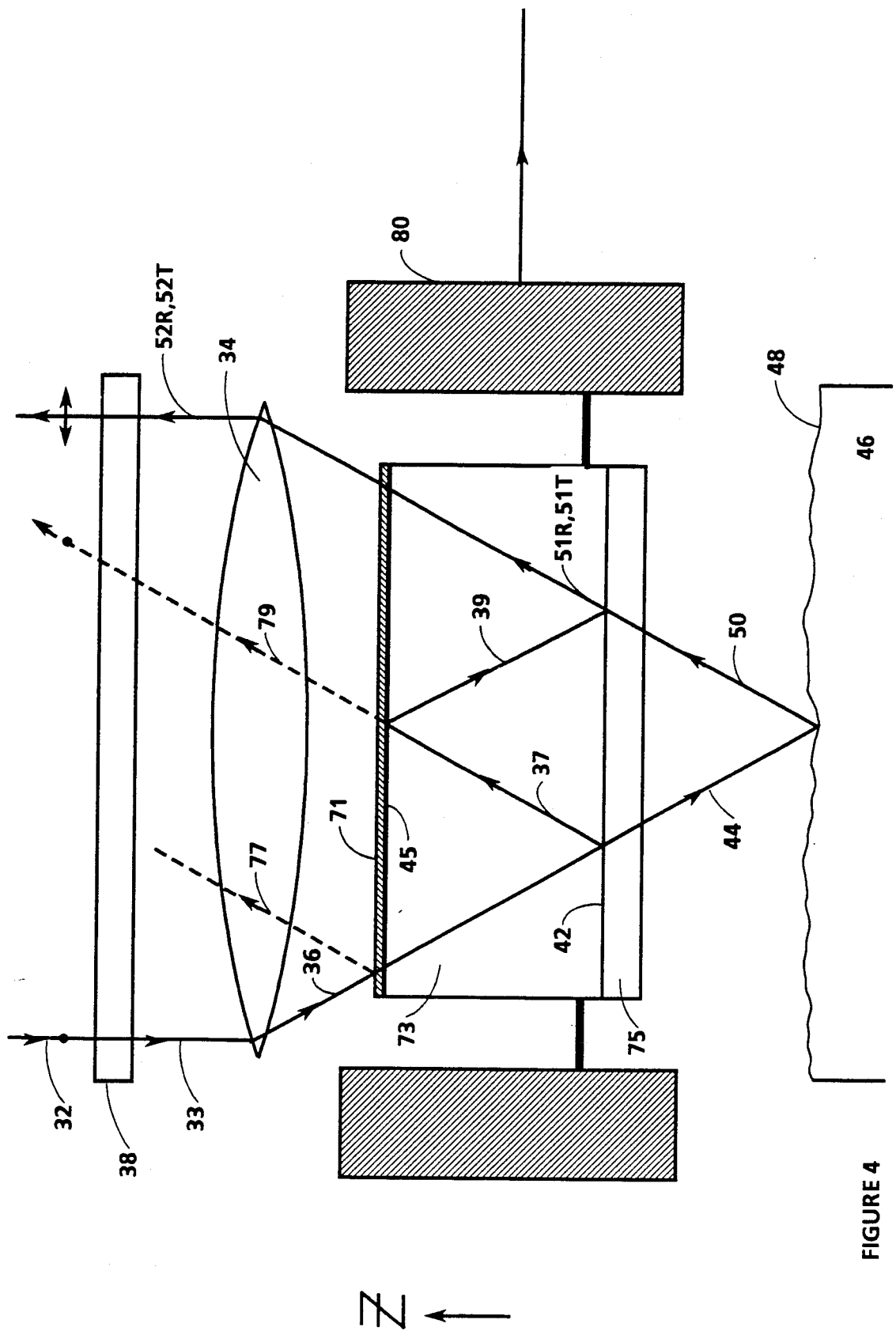
FIG. 4 depicts in schematic form a fourth embodiment of the instant invention.

FIG. 4 depicts in schematic form a fourth embodiment of the instant invention for providing noncontact measurement of the profile of a surface. A number of elements and functions thereof are common to the first embodiment of the instant invention and hence given the same reference numbers. While the apparatus of the present embodiment of the instant invention has application for a wide range of spatially and temporally coherent or incoherent radiation sources, the following description is taken by way of example, with respect to an optical measuring system, such as one employing a linearly polarized laser. The collimated wavefronts (32) first pass through a quarter-wave phase retardation plate (38) converting the linearly polarized light into circularly polarized light and are then directed through objective lens (34) to become converging wavefronts (36). Converging wavefronts (36) are transmitted through a reference surface coating (79), as described in my copending U.S. patent application entitled "Coating and Method for Testing Plano and Spherical Wavefront Producing Optical Surfaces and Systems Having a Broad Range of Reflectivities" (Docket No. 2190-26-AP-00, dated October 16, 1987), which extends across the full aperture of the reference surface (45) such that the converging wavefronts (36) are minimally reflected from the reference surface coating (71) reference surface (45) interface as represented by reflected wavefronts (77). No central obscuration is presented by the reference surface coating (71) to the converging wavefronts (36) so that low power objective lens (34) magnifications (i.e., 1X-5X) can now be utilized in a Mirau type interferometer configuration. Also, a subsequent gain of mid-range spatial frequency response in higher magnification (i.e., 10X-40X) objective lens (34) transfer functions can be realized with the absence of the central obscuration inherent in the conventional Mirau type interferometer design. The beamsplitter surface (42) reflects half of the incident beam intensity of the converging wavefronts (36) upward to become converging test wavefronts (37) which come to a focus on the reference surface (45). The reference surface coating is such that a portion of the converging test wavefronts (37) beam intensity, about 20% so as to maximize fringe contrast at test surface reflectivity extremes of 4% and 100%, is reflected from the reference surface (45) reference surface coating (71) interface to become diverging reference wavefronts (39). The remainder of the converging test wavefronts (37) beam intensity is partly absorbed and partly transmitted through the reference surface coating (71) as represented by diverging wavefronts (79). Interferometer substrate (73) is a quarter-wave phase retardation plate and when properly aligned to the quarter-wave phase retardation plate (38) produces a full-wave of phase retardation to diverging wavefronts (79) resulting in no net polarization rotation relative to the collimated wavefronts (32) which causes the diverging wavefronts (79) to be reflected from the polarizing beamsplitter diagonal surface (31) and return to the light source (10) rather than the photosensitive elements (58), or pixels, of an imaging device (56) which would cause a loss of fringe contrast. The portion of the incident beam intensity of the converging wavefronts (36) not reflected by the beamsplitter surface (42) is transmitted through the interferometer beamsplitter substrate (75), also a quarter-wave phase retardation plate, to become the converging test wavefronts (44) which then focus onto the test surface (48). The converging test wavefronts (44) reflected from the test surface (48) emerge to become diverging test wavefronts (50) which are again transmitted through interferometer beamsplitter substrate (75) and recombine and interfere at the beamsplitter surface (42) to become diverging test and reference wavefronts (51R, 51T). Diverging test and reference wavefronts (51R, 51T) are collected by objective lens (34) to become recollimated test and reference wavefronts (52R, 52T) which then pass through the quarter-wave phase retardation plate (38) becoming test and reference wavefronts (53R, 53T). A total phase retardation of one full-wave and a half is experienced by both the test and reference wavefronts (53R, 53T) so that the polarization of the test and reference wavefronts (53R, 53T) are rotated 90° relative to the collimated wavefronts (32) thereby permitting total transmission through the polarizing beamsplitter (30). The test and reference wavefronts (53R, 53T) are made converging test and reference wavefronts (54R, 54T) by the imaging lens (65) which then focus onto the photosensitive elements (58), or pixels, of an imaging device (56). The converging test and reference wavefronts (54R, 54T) brought to a focus form overlaying images of the test surface (48) and reference surface (45) together with the interference pattern representing the relative optical path differences between the test surface (48) and reference surface (45).

Figure 5:
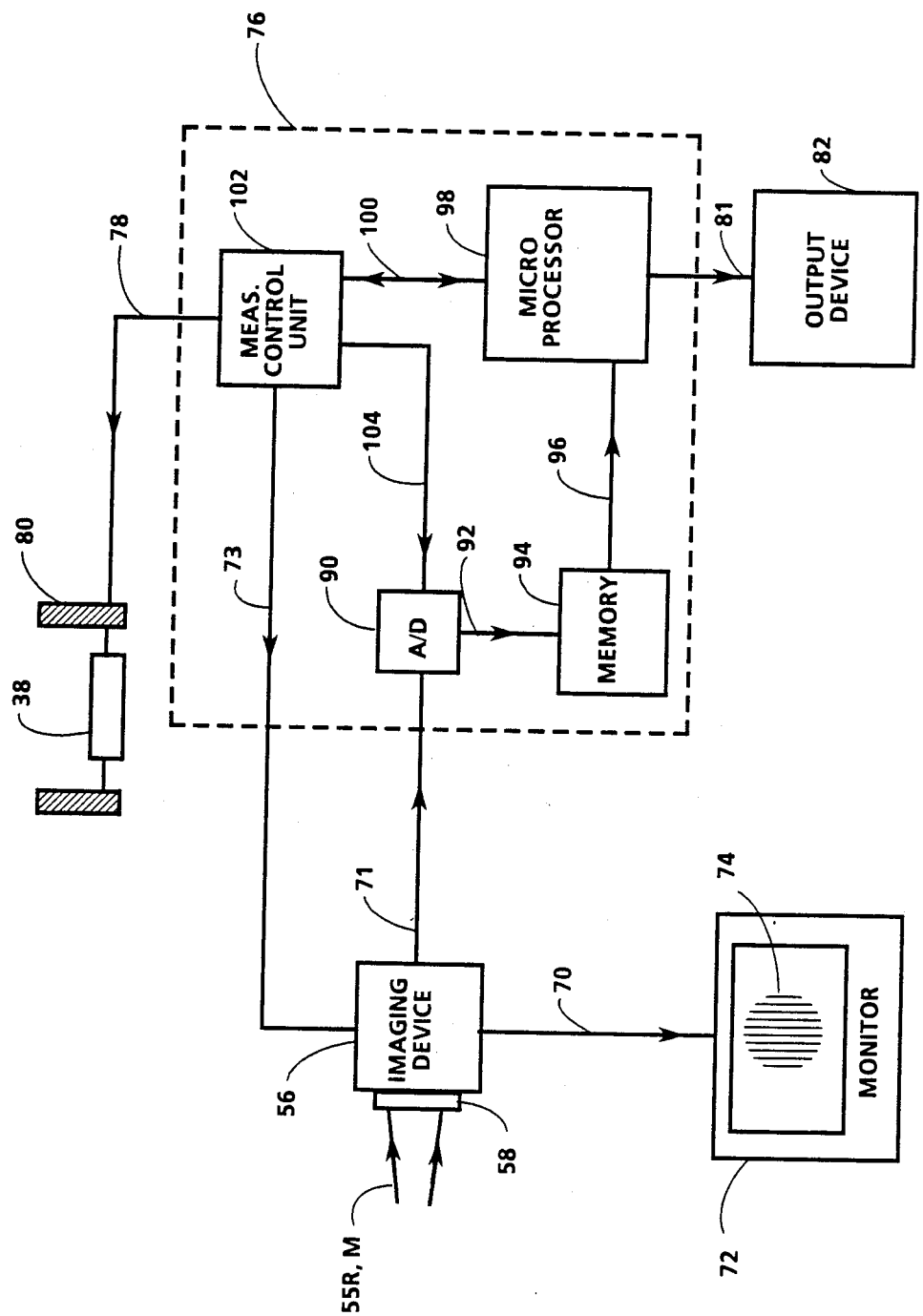
FIG. 5 depicts a schematic block diagram of the electronic processor circuitry portion of the instant invention.

FIG. 5 depicts a schematic block diagram of the electronic processor circuitry (76) used in the embodiment of FIG. 1 through FIG. 4. In FIG. 5, the interference of wavefronts (55R) and (55M) forms an interference pattern on photosensitive elements (58) of the imaging device (56). Output (71) of the imaging device (56) is preferably fed into an analog-to-digital converter (90) to provide a digital signal (92) which is stored in memory (94). A microprocessor (98) is provided in electronic processor (76) which not only manipulates the data stored in memory (94), received via digital signal (96), but also provides and receives signals (100) with the measurement control unit (102) and provides an output signal (81) to the output device (82) which may be a printer, CRT, or plotter, for example. The measurement control unit (102) provides the electronic output signal (78) to the piezoelectric transducer (80); a clock signal (73) to the imaging device (56); and a synchronization signal (104) to the A/D converter (90).

A phase map of the interference pattern can be conventionally produced with the method described by M. Schaham, *Proceedings SPIE*, Vol. 306, pp. 183-191 (1981). However, the present invention is not limited to this method and can be used with a variety of phase map methods, e.g., see Gallagher, et al., U.S. Pat. No. 3,694,088, issued September 26, 1972.

While the invention has been described with reference to several embodiments thereof, those skilled in the art will be able to make various modifications to the described embodiments of the invention without departing from the true spirit and scope thereof. It is intended that structures similar to those described herein in that their elements perform substantially the same function in substantially the same way to achieve substantially the same result are to be considered within the scope of the invention. For example, other types of two-beam interferometers than those described can be used. Essentially the same function can be obtained with other types of solid-state arrays. Other techniques than by using a piezoelectric transducer to vary the relative distance between the test and reference surfaces could be used for producing the constant time varying phase shift between the test wavefronts and reference wavefronts. For example an acousto-optic Bragg cell could be utilized to shift the frequency (and phase) between the test wavefronts and reference wavefronts, or a moving difraction grating could be utilized to provide a Doppler shift in one or both of the test wavefronts or reference wavefronts, or various rotating polarization plates could be utilized to shift the phase of one or both of the test wavefronts or reference wavefronts. A Zeeman split, or other two frequency laser could be utilized to provide one frequency in the test leg of the interferometer and a different frequency (and phase) in the reference leg. In some instances, a vidicon camera could be used instead of a solid-state array. In general, a phase shifting mirror or other phase shifting means can be used in either leg or both legs of the interferometer. An eye lens can be used in place of the imaging device for qualitative viewing. The illumination can be either Kohler or critical or variations thereon.

The principal advantage of the instant invention is: (1) a temporally coherent light source permits interference to be localized over the entire depth of focus of every objective lens magnification making the acquisition of fringes substantially easier than the prior art. (2) An extended, spatially incoherent source avoids the disadvantages of coherent illumination such as reduced lateral resolution, sensitivity to system artifacts, and extraneous wavefront interference distorting the desired phase map. (3) The instant invention eliminates the central obscuration of the Mirau type interferometer allowing low magnification (i.e., 1X-5X) objectives to be utilized as well as improving the mid-range spatial frequency response of the objective lens optical transfer function to attain better image contrast.

While a preferred embodiment of the invention has been disclosed, obviously modification can be made therein, without departing from the scope of the invention as defined in the following claims.

What is claimed is:

1. An interferometric profiler capable of measuring the topography of a test surface comprising an illumination source for providing a first spatially and temporally coherent input beam; means optically aligned with said input beam for enabling light from said source to impinge thereon for forming a second extended light source for providing a light beam having reduced spatial coherence from said input beam while retaining high temporal coherence; optical system means optically aligned with said second extended light source for collecting and directing said light beam produced from said extended second light source; a second lens optically aligned with said light beam for focusing said light beam onto a reference surface and said test surface; two beam interferometer means optically aligned with said light beam for dividing said light beam into test and reference wavefronts and directing said test and reference wavefronts onto said test and reference surfaces; means for varying the realtive distance between said reference surface and said test surface; means for recombining said test wavefronts and reference wavefronts after they have interacted with said test and reference surfaces; an image sensing device comprising means for photosensing and viewing an interference pattern produced from said recombined reference and test wavefronts; means for imaging said test and reference surfaces onto said photosensitive elements of said image sensing device; and means for processing the output of said image sensing device for providing a topographic profile of said test surface.

2. An interferometric profiler in accordance with claim 1 wherein said means for imaging said test surface onto said photosensitive elements of said image sensing device comprises means for bringing the test surface into focus onto said photosensitive elements of said image sensing device.

3. An interferometric profiler in accordance with claim 1 wherein said first input beam illumination source comprises a linearly polarized laser source.

4. An interferometric profiler in accordance with claim 3 wherein said laser source comprises a linearly polarized single frequency laser source.

5. An interferometric profiler in accordance with claim 1 wherein said extended light source means for providing said light beam comprises a rotating diffuser disc onto which said illumination source impinges to form said extended source.

6. An interferometric profiler in accordance with claim 5 wherein said optical system means for collecting and directing said light beam comprises a lens and a beamsplitter means for collecting and directing said light beam created by said extended source without significant light loss.

7. An interferometric profiler in accordance with claim 6 wherein said beamsplitter means comprises a polarizing beamsplitter.

8. An interferometric profiler in accordance with claim 7 wherein said first input beam illumination source comprises a linearly polarized laser source.

9. An interferometric profiler in accordance with claim 7 wherein said beamsplitter means further comprises a quarter-wave phase retardation plate.

10. An interferometric profiler in accordance with claim 1 wherein said optical system means for collecting and directing said light beam comprises a lens and a beamsplitter means for collecting and directing said light beam.

11. An interferometric profiler in accordance with claim 10 wherein said beamsplitter means comprises a polarizing beamsplitter.

12. An interferometric profiler in accordance with claim 11 wherein said first input beam illumination source comprises a linearly polarized laser source.

13. An interferometric profiler in accordance with claim 11 wherein said beamsplitter means further comprises a quarter-wave phase retardation plate.

14. An interferometric profiler in accordance with claim 1 wherein said image sensing device comprises a solid state array camera.

15. An interferometric profiler in accordance with claim 14 wherein said first input beam illumination source comprises a linearly polarized laser source.

16. An interferometric profiler in accordance with claim 14 wherein said means for providing said light beam comprises a rotating diffuser disc onto which said illumination source impinges for forming said extended source.

17. An interferometric profiler in accordance with claim 16 wherein said optical system means for collecting and directing said light beam comprises a lens and a beamsplitter means for collecting and directing said light beam created by said extended source without significant light loss.

18. An interferometric profiler in accordance with claim 17 wherein said beamsplitter means comprises a polarizing beamsplitter.

19. An interferometric profiler in accordance with claim 14 wherein said optical system means for collecting and directing said light beam comprises a lens and a beamsplitter means for collecting and directing said light beam.

20. An interferometric profiler in accordance with claim 19 wherein said beamsplitter means comprises a polarizing beamsplitter.

21. An interferometric profiler in accordance with claim 1 wherein said means for varying the relative difference between said reference surface and said test surface comprises a piezoelectric transducer.

22. An interferometric profiler in accordance with claim 1 wherein said two-beam interferometer means comprises an equal path two-beam interferometer means.

23. An interferometric profiler in accordance with claim 22 wherein said first input beam illumination source comprises a linearly polarized laser source.

24. An interferometric profiler in accordance with claim 23 wherein said linearly polarized laser source comprises a linearly polarized single frequency laser source.

25. An interferometric profiler in accordance with claim 5 wherein said two-beam interferometer means comprises an equal path two-beam interferometer means.

26. An interferometric profiler in accordance with claim 25 wherein said optical system means for collecting and directing said light beam comprises a lens and a beamsplitter means for collecting and directing said light created by said extended source without significant light loss.

27. An interferometric profiler in accordance with claim 26 wherein said beamsplitter means comprises a polarizing beamsplitter.

28. An interferometric profiler in accordance with claim 27 wherein said beamsplitter means further comprises a quarter-wave phase retardation plate.

29. An interferometric profiler capable of measuring the topography of a test surface comprising an illumination source for providing a linearly polarized input beam; means optically aligned with said input beam for providing a second linearly polarized beam having reduced spatial coherence from said input beam while retaining said temporal coherence of said input beam; means optically aligned with said second beam for collecting and directing said second linearly polarized beam; means optically aligned with said second beam and said test surface and a reference surface for converting said linearly polarized second beam into a circularly polarized beam and for rotating the incident linear polarization of said second beam reflection from said test and reference surfaces; means for focusing said circularly polarized light beam; means optically aligned with said circularly polarized beam for converting said circularly polarized beam into a second linearly polarized light beam; means for dividing said second linearly polarized light beam into a test wavefront and a reference wavefront and for directing said test wavefront and said reference wavefront onto said test surface and said reference surface; means for varying the relative distance between said reference surface and said test surface; means for recombining said reference wavefront and said test wavefront after they have interacted with said test and reference surfaces for producing an interference pattern; an image sensing device having a plurality of photosensitive elements, said image sensing device comprising means for photosensing and viewing an interference pattern produced from said recombined reference and test wavefronts; means for imaging said test and reference surfaces onto said photosensitive elements of said image sensing devices; and means for processing the output of said image sensing device for providing a profile of said test surface.

30. An interferometric profiler in accordance with claim 29 further comprising means for providing said reference surface without obscuring said test and reference wavefronts when imaging said test and reference surfaces onto said photosensitive elements.

31. An interferometric profiler in accordance with claim 30 wherein said means for providing said reference surface comprises a metallic or semi-metallic coating on said reference surface and an anti-reflection coating on said metallic or semi-metallic coating.

32. An interferometric profiler in accordance with claim 29 wherein said means for imaging said test surface onto said photosensitive elements of said image sensing device comprises means for bringing the surface under test into focus onto said photosensitive elements of said image sensing device.

33. An interferometric profiler in accordance with claim 29 wherein said first input beam illumination source comprises a linearly polarized laser source.

34. An interferometric profiler in accordance with claim 33 wherein said first input beam illumination source comprises a linearly polarized single frequency laser source.

35. An interferometric profiler in accordance with claim 29 wherein said means for providing said second linearly polarized beam comprises a rotating diffuser disc onto which said illumination source impinges for forming an extended source.

36. An interferometric profiler in accordance with claim 35 wherein said means for collecting and directing said second linearly polarized beam comprises a lens and a beamsplitter for collecting and directing said second linearly polarized beam created by said extended source without significant light loss.

37. An interferometric profiler in accordance with claim 36 wherein said beamsplitter comprises a polarizing beamsplitter.

38. An interferometric profiler in accordance with claim 37 wherein said first input beam illumination source comprises a linearly polarized laser source.

39. An interferometric profiler in accordance with claim 38 further comprising means for providing said reference surface without obscuring said test and reference wavefronts when imaging said test and reference surfaces onto said photosensitive elements.

40. An interferometric profiler in accordance with claim 29 wherein said means for collecting and directing said second linearly polarized beam comprises a lens and a beamsplitter for collecting and directing said second linearly polarized beam.

41. An interferometric profiler in accordance with claim 40 wherein said beamsplitter comprises a polarizing beamsplitter.

42. An interferometric profiler in accordance with claim 41 wherein said first input beam illumination source comprises a linearly polarized single frequency laser source.

43. An interferometric profiler in accordance with claim 42 further comprising means for providing said reference surface without obscuring said test and reference wavefronts when imaging said test and reference surfaces onto said photosensitive elements.

44. An interferometric profiler in accordance with claim 29 wherein said means for converting said linearly polarized second beam into a circularly polarized beam and for rotating said incident linear polarization of said second beam comprises a quarter-wave phase retardation plate.

45. An interferometric profiler in accordance with claim 44 wherein said first input beam illumination source comprises a linearly polarized single frequency laser source.

46. An interferometric profiler in accordance with claim 44 further comprising means for providing said reference surface without obscuring said test and reference wavefronts when imaging said test and reference surfaces onto said photosensitive elements.

47. An interferometric profiler in accordance with claim 44 wherein said means for providing said second linearly polarized beam comprises a rotating diffuser disc onto which said illumination source impinges for forming an extended source.

48. An interferometric profiler in accordance with claim 47 wherein said means for collecting and directing said second linearly polarized beam comprises a lens and a beamsplitter for collecting and directing said second linearly polarized beam created by said extended source without significant light loss.

49. An interferometric profiler in accordance with claim 48 wherein said beamsplitter comprises a polarizing beamsplitter.

50. An interferometric profiler in accordance with claim 44 wherein said means for collecting and directing said second linearly polarized beam comprises a lens and a beamsplitter for collecting and directing said second linearly polarized beam.

51. An interferometric profiler in accordance with claim 50 wherein said beamsplitter comprises a polarizing beamsplitter.

52. An interferometric profiler in accordance with claim 29 wherein said means for varying the relative difference between said reference surface and said test surface comprises a piezoelectric transducer.

53. An interferometric profiler in accordance with claim 52 wherein said first input beam illumination source comprises a linearly polarized single frequency laser source.

54. An interferometric profiler in accordance with claim 52 wherein said means for converting said linearly polarized second beam into a circularly polarized beam and for rotating said incident linear polarization of said second beam comprises a quarter-wave phase retardation plate.

55. An interferometric profiler in accordance with claim 52 further comprising means for providing said reference surface without obscuring said test and reference wavefronts when imaging said test and reference surfaces onto said photosensitive elements.

56. An interferometric profiler in accordance with claim 52 wherein said means for providing said second linearly polarized beam comprises a rotating diffuser disc onto which said illumination source impinges for forming an extended source.

57. An interferometric profiler in accordance with claim 56 wherein said means for collecting and directing said second linearly polarized beam comprises a lens and a beamsplitter for collecting and directing said second linearly polarized beam created by said extended source without significant light loss.

58. An interferometric profiler in accordance with claim 57 wherein said beamsplitter comprises a polarizing beamsplitter.

59. An interferometric profiler in accordance with claim 52 wherein said means for collecting and directing said second linearly polarized beam comprises a lens and a beamsplitter for collecting and directing said second linearly polarized beam.

60. An interferometric profiler in accordance with claim 59 wherein said beamsplitter comprises a polarizing beamsplitter.

61. An interferometric profiler in accordance with claim 29 wherein said image sensing device comprises a solid state array camera.

62. An interferometric profiler in accordance with claim 61 wherein said first input beam illumination source comprises a linearly polarized single frequency laser source.

63. An interferometric profiler in accordance with claim 61 wherein said means for converting said linearly polarized second beam into a circularly polarized beam and for rotating said incident linear polarization of said second beam comprises a quarter-wave phase retardation plate.

64. An interferometric profiler in accordance with claim 61 further comprising means for providing said reference surface without obscuring said test and reference wavefronts when imaging said test and reference surfaces onto said photosensitive elements.

65. An interferometric profiler in accordance with claim 61 wherein said means for providing said light beam comprises a rotating diffuser disc onto which said illumination source impinges for forming said extended source.

66. An interferometric profiler in accordance with claim 65 wherein said optical system means for collecting and directing said light beam comprises a lens and a beamsplitter means for collecting and directing said light beam created by said extended source without significant light loss.

67. An interferometric profiler in accordance with claim 64 wherein said beamsplitter means comprises a polarizing beamsplitter.

68. An interferometric profiler in accordance with claim 61 wherein said optical system means for collecting and directing said light beam comprises a lens and a beamsplitter means for collecting and directing said light beam.

69. An interferometric profiler in accordance with claim 68 wherein said beamsplitter means comprises a polarizing beamsplitter.

70. An interferometric profiler in accordance with claim 61 wherein said means for varying the relative difference between said reference surface and said test surface comprises a piezoelectric transducer.

71. An interferometric profiler in accordance with claim 29 wherein said means for converting said linearly polarized second beam into a circularly polarized beam and for rotating the incident linear polarization of said second beam comprises means for rotating said incident linear polarization by 90 degrees after said reflection form said test and reference surfaces.

72. An interferometric profiler in accordance with claim 29 further comprising means for optically isolating said imaged test and reference surfaces and said interference pattern.

73. An interferometric profiler in accordance with claim 29 wherein said first input beam illumination source is spatially and temporally coherent.

74. An interferometric profiler in accordance with claim 29 wherein said first input beam illumination source is spatially and temporally incoherent.

75. An interferometric profiler in accordance with claim 29 wherein said first input beam illumination source is spatially coherent and temporally incoherent.

76. An interferometric profiler in accordance with claim 29 wherein said first input beam illumination source is spatially incoherent and temporally coherent.

77. An interferometric profiler in accordance with claim 29 wherein said means optically aligned with said input beam for providing a second linearly polarized beam having high spatial and temporal coherence.

78. An interferometric profiler in accordance with claim 29 wherein said means optically aligned with said input beam for providing a second linearly polarized beam having high spatial and temporal coherence.

79. An interferometric profiler in accordance with claim 29 wherein said means optically aligned with said input beam for providing a second linearly polarized beam having high spatial coherence but low temporal coherence.

80. An interferometric profiler in accordance with claim 29 wherein said means optically aligned with said input beam for providing a second linearly polarized beam having low spatial and temporal coherence.

* * * * *